United States Patent Office 3,235,635
Patented Feb. 15, 1966

3,235,635
METHOD OF PREPARING PERLITE PRODUCTS
Raymond G. Riede, Spring Run, Martinsville, N.J., assignor to Johns-Manville Corporation, New York, N.Y., a corporation of New York
No Drawing. Filed June 2, 1961, Ser. No. 114,314
10 Claims. (Cl. 264—56)

This invention relates to a new method of manufacturing perlitic products and to products thereof. More particularly, the invention relates to the manufacture of high filtration flow rate perlite filter aids which flow rates are much higher than those heretofore realized from perlite products produced by conventional methods. By means of this invention it is now possible to produce a complete range of perlite filter aids covering substantially the same flow rate range of other commercially available filter aids such as diatomaceous silica.

HISTORY

In commercial usage the term "perlite" refers to any naturally occurring glass of igneous origin that will expand when heated to yield a light, cellular particle. The term is also appiled to the expanded product. In strict geological usage, the term is restricted to a single varietay of volcanic glass in which strain incident to cooling has yielded a concentric or "onion" structure of fracturing which may be visible to the naked eye or may be observed under the microscope. The volcanic glasses that expand on heating to a commercial product generally have a chemical composition corresponding to that of rhyolite when computed on a water-free basis, although some are dacite.

Perlite rock usually is brittle, friable, and colored tan to grey; however, wide variations from the classical appearance have been observed in both texture and color. It is found throughout the world, restricted, however, to areas of acid volcanic occurrence. In the United States such areas occur only in the western part of the country.

Commercially usable perlite generally has a silica content of greater than 70% and a combined water content of from about 2% to about 5%. Acid volcanic glasses containing less combined water than perlite are classed as obsidians, and those containing more combined water, as pitchstone. In addition to silica and water, perlite contains alumina, soda, potash and lesser amounts of other constituents.

Filter aids formed from perlite have been widely used in the filtration of various materials with present day conventional filtering equipment. As with all filter aids, those of perlite are materials which serve to remove solids suspended from liquids by forcing the liquid through a permeable member which serves to retain the solid particles. The porous filter cake formed by the perlitic particles is capable of entraining suspended gelatinous or fine particles present in the unfiltered liquid and yet leave channels in the filter cake through which the pure liquid, freed of its suspended matter, may pass at a rate and under such pressure differentials as are economically practical. It is generally recognized that there is an inverse correlation between filtration rate and clarity when employing any filter aid, and this relation in general holds true for a perlite filter aid. For the same pressure differential, the flow rate of the fine particle size filter aid will be considerably less than that of the coarser filter aid. Inversely, the clarity of the filtrate through the less porous cake will normally be higher than that through the porous cake. Clarity is often the principal factor desired in the filtrate and, hence, in order to obtain proper clarity, some filtration procedures must be carried out at high, uneconomical pressure differentials in order to get practical flow rates, or relatively slow flow rates are used when high pressure differentials are not possible.

The conventional method of manufacturing filter aids from perlite ore consists of expandinig a properly graded ore, generally about 30 to about 100 mesh, in a furnace to an aggregate density of from 2 to 4 lbs./cu. ft. When perlitic particles are introduced into a flame and expanded under a control temperature on the order of 1600° F., the softening of the glass, coincident with the volatilization and release of the combined water causes the particle to "pop," expand, or puff up to an aggregate many times its original volume. However, dependent upon its origin, perlite minerals differ markedly on the time and temperature necessary for expansion with the control temperature varying generally between 1400° F. and 2000° F. It is realized, of course, that the flame temperatures are much higher but these are generally not measured.

Heretofore, manufacturers of perlite filter aids have used vertical expanding furnaces or an inclined stationary furnace to achieve various desired density aggregates. Horizontal furnaces have been commonly used for manufacture of a heavier density aggregate for plaster and concrete aggregates. Examples of methods employing the horizontal furnace or similar apparatus may be found in U.S. Letters Patent Nos. 2,501,962 and 2,621,160. Illustrative of the vertical processes are U.S. Letters Patent Nos. 2,536,742 and 2,666,632. After being expanded, the aggregates are then comminuted in a mill and the milled material may be classified in convention separators to produce the desired end-product such as filter aids.

In order to evaluate the flow rate characteristics of filter aid particles, a test has been devised whereby the relative filtration rates of particulate filter aids may be determined. Figures are obtained based upon the average filtration rate in ml./sec. of a ½% solids slurry of filter aid through a 2 in. diameter, 325 mesh screen filter at 200 mm. mercury pressure differential. This number has been termed "alpharate" for purposes of identification. Heretofore alpharates of about 30 to about 50 have been obtained by perlite filter aids. On the other hand, alpharates many times this have been obtained from diatomaceous silica products. It should be noted that for purposes of this invention as disclosed and claimed herein, alpharate shall have the meaning as so defined.

In the manufacture of diatomaceous silica filter aids, various techniques have been devised whereby it is possible to obtain good filtrate clarities coupled with these economical flow rates. The manufacture of higher flow rate filter aids has involved additional treatment of the products during calcination of such raw diatomaceous silica particles. Calcining is ordinarily effected in a large rotary kiln with the addition of an alkali metal flux, which is conventionally added in the form of powder blown into the earth before its entry into the kiln. The use of an added flux during calcination of diatomaceous silica, as first proposed by Calvert et al., U.S. Letters Patent No. 1,502,547, and subsequently modified by Stockton and Cummins in U.S.. Letters Patent Nos. 1,970,204 and 1,970,280, respectively, is normally employed when filter aids of the highest flow rate are desired. Other U.S. Letters Patent, Nos. 1,966,362, 1,966,363, both to Stockton, teach variations of the diatomaceous silica calcination process.

Filter aids formed by a calcining procedure including the use of flux exhibit a flow rate approximately 5 times that of the uncalcined diatomaceous silica filter aid. High flow rate products can be secured by air classification of the product of flux calcination. Clarity obtained in the filtrate of the raw sugar solution would range from about 85% of that obtained with the natural powder when using a straight calcined filter aid, through about 60% of that of the natural powedr when using the flux calcined product, down to about 30% of that of the natural oowder when using the fastest flow rate, air classified, flux calcined product.

Still more recently, a method has been devised whereby diatomaceous silica particles may be treated prior to calcination to effect still higher flow rates. See U.S. Serial No. 691,119 filed Oct. 21, 1957 now U. S. Letters Patent No. 3,013,981. Similar treatment or agglomeration has also been suggested for fly ash filter aids as in U.S. Letters Patent No. 2,892,240.

Obviously, it would be extremely advantageous if perlite filter aids could be obtained, which would give flow rates comparable to those obtained with the diatomaceous silica products which have evidenced alpharates as high as 200.

While perlite filter aids generally are characterized as possessed of alpharates between 30 and 50, a recent development should be mentioned which has permitted an increase in flow rate properties of perlite particles. This method and the new product therefrom are disclosed in U.S. Letters Patent application Ser. No. 114,495 filed concurrently herewith on June 2, 1961, the subject matter relating to the method of horizontally expanding low density products.

OBJECTS

Accordingly, it is a principal object of this invention to provide a new method of preparing perlitic filter aids which products overcome the aforementioned disadvantages.

It is another object of this invention to provide a method of treating perlitic materials to obtain therefrom a filter aid having high flow rate characteristics and good clarifying characteristics.

It is another object of this invention to provide a method of treating perlite materials whereby the filter aid product processed therefrom will exhibit faster flow rates than heretofore obtained.

It is an additional object of this invention to provide a method of treating perlite particles heretofore considered possessed of maximum flow rate characteristics to obtain products having higher flow rates coupled with clarification characteristics rendering them suitable for use as filter aids.

It is another and more specific object of this invention to provide new perlite filter aids of fast flow rate characteristics.

These and other objects of the invention will become apparent from consideration of the following detailed description of the invention.

BRIEF DESCRIPTION OF THE INVENTION

It has been discovered that the foregoing objects, among others, are accomplished by a post treatment of certain expanded perlite products. It has been surprisingly found that improved flow rates result by first coalescing the expanded powders into discrete particles and then subjecting them to an additional heat step to calcine the particles and subsequently milling and classification to obtain filter aid products. The particulars of the coalescing step are more fully set forth below. Further benefits are realized when a fluxing agent such as soda ash is added in addition to the coalescing agent. And still further, it has been discovered that improved flow rate characteristics are possible by the use of a fluxing agent alone and calcining the mixture of the agent and perlite powder. The products of these new processes provide perlite filter aids possessed of flow rate characteristics heretofore not thought possible for perlite and permits a flow rate range for perlite products comparable to other commercial filter aids such as diatomaceous silica.

DETAILED DESCRIPTION OF THE INVENTION

A more complete understanding of the invention may be obtained by reference to the following examples of actual operations carried out in accordance with the invention. In these examples all parts and percentages are by weight unless otherwise indicated.

In carrying out the procedure of the invention, the crude perlite ore is initially expanded and milled in accordance with known conventional procedures, such as those described hereinabove, to produce a filter aid powder with normal flow characteristics.

In all the examples, an expanded perlite product "Celite J5," marketed by Johns-Manville under that trademark, was used. This product has an alpharate of about 55.

The Celite J5, serving as the raw material, was added to a ribbon blender. While mixing the agents, either soda ash or water or both were added. All of the ingredients were mixed together for ten minutes. The mixed charge was then placed in a flat bed muffle furnace for 30 minutes. The calcined material was then milled through a fan and collected in conventional air separation equipment, i.e., cyclone and baghouse collectors. The collected fractions were then combined to make the final product.

Past experience has shown that the correlation between muffle calcination and large scale, commercial calcination as performed in a rotary kiln is good. It is anticipated therefore that the favorable results recorded herein could be readily reproduced in commercial practice.

Example I

Three hundred parts of expanded perlite was intimately mixed with 12 parts of soda ash and calcined at 1425° F. After milling, the composited product had an alpharate of 76.9.

Example II

Three hundred parts of expanded perlite was intimately mixed with 150 parts of water and calcined at 1700° F. After milling, the composited product had an alpharate of 100.5.

Example III

Three hundred parts of expanded perlite was intimately mixed with 150 parts of water and 12 parts of soda ash and calcined at 1360° F. After milling, the composited product had an alpharate of 169.0.

Example IV

Three hundred parts of expanded perlite was intimately mixed with 150 parts of water and 18 parts of soda ash and calcined at 1230° F. After milling, the composited product had an alpharate of 218.0.

Other properties of these products are shown in Table 1.

TABLE 1

*Product properties*

| Sample | Ex. I | Ex. II | Ex. III | Ex. IV |
|---|---|---|---|---|
| Alpharate | 76.9 | 100.5 | 169.0 | 218.0 |
| Cake Density, p.c.f. | 14.5 | 16.0 | 14.6 | 15.5 |
| Residue on 150M, percent | | 8.6 | 8.7 | 8.9 |
| Filtration rate on Sugar syrup vs. Celite filter aid, compared material in parentheses, percent | 88 (Celite 535) | 108 (Celite 535) | 102 (Celite 545) | 120 (Celite 545) |
| Clarifying capacity on Sugar syrup vs. Celite filter aid, compared material in parentheses, percent | 91 (Celite 535) | 84 (Celite 535) | 91 (Celite 545) | 81 (Celite 545) |

For reference, the flow rate ratio of Celite 535 to Celite 545 is 100:160, and the clarifying capacity ratio is 100:78. Both are diatomaceous silica products marketed by Johns-Manville and represent the high end of the flow rate range for filter aids produced from diatomaceous silica.

The alpharate test best illustrates the improvement in flow rate. The filtration data on sugar syrup are given to illustrate that the products of the instant invention have adequate clarifying ability and can therefore be considered as satisfactory filter aids.

In accordance with this invention the expanded perlite is treated with an agglomerating material prior to its entry into the kiln. The perlite particles are charged to a mixing device which will serve to agitate the materials by a mixing procedure which substantially preserves the structure and particle size of the particles and more importantly to form an agglomerated material. Any suitable mixing device which will not exert a destructive force upon the structure of the particles may be employed in this stage of the procedure. Such mixing devices as a ribbon mixer, paddle mixer, tumble mixer or the type of a rotary mixer, which carry the material up the sides of the drum where it will cascade down by gravitational forces (e.g., cement type mixer), conical or V-type blender, etc., may be employed.

To the moving mass of particles a suitable liquid in amount sufficient to coalesce the mixture is added, i.e., approximately 10% to 100% by weight of the dry material. It is important in the formation of discrete agglomerates that the liquid be added to the moving mass of material in the form of finely divided atomized droplets as, for example, by spraying. The mixing is continued for a sufficient length of time to enable thorough distribution of the finely divided droplets though the mass of moving perlite to result in a coalesced mixture of materials in the form of discrete agglomerates. Dependent upon the size of the mixing chamber and the rate of spraying of the liquid, the materials are mixed from approximately 1 to 60 minutes, preferably about 2 to 20 minutes.

Since the liquid is to be added in the form of finely divided atomized droplets, such as those obtained with conventional spraying equipment, it is apparent that the liquid must have the characteristic of sufficient fluidity at ambient or elevated temperatures to enable it to be atomized and deposited upon the moving mass of particles. Water is the preferred liquid for use in this invention, but other liquids having this characteristic have been found suitable and are discussed hereinafter.

When the perlite is to be calcined in the presence of added fluxing material, such as soda ash, sodium chloride, sodium silicate, lime, etc., the mixed materials may be fed directly from the mixer to the kiln and subjected to the necessary calcination temperatures. It is not necessary, however, to have the material in the wet state when fed to the kiln, since the advantages of this invention can be obtained when the material is dried after being sprayed, and then subsequently fed to the kiln for calcination.

A fluxing agent may be added before or after the perlite has been mixed with liquid. In the preferred embodiment of the invention, the soda ash or other fluxing agent is added dry and mixed, and the water sprayed onto the tumbling mass of earth particles. Due to certain economies in the addition of the two materials in the form of a solution rather than two separate products, an alternative procedure uses a solution of the flux and this is sprayed onto the moving mass. Obviously, the concentration of flux solution used in accordance with this latter procedure must be determined by two factors.

The amount of water present must be within the aforementioned range of 10% to 100% by weight of the dry perlite particles. The amount of flux which must be added, in accordance with the invention, to the perlite is dependent upon the degree of sintering desired which, in turn, is dependent upon the melting point curve between the flux and the perlite. Preferably the flux solids will be added to the perlite particles in amount up to approximately 20% by weight thereof, and in most instances, approximately 2% to 12% by weight is used. Considering these separate determinative factors for water and flux, a solution of the desired concentration can be formed.

As heretofore indicated, filter aids manufactured in accordance with conventional expansion and milling methods, have exhibited flow rates of about 30 to 50 measured as alpharate. The instant method permits the production of filter aids with flow rates substantially higher than that of the original material. As shown in the foregoing examples, this invention enables the manufacture of filter aids with flow rates substantially higher than those heretofore obtained.

As set forth hereinbefore, water being readily sprayable and economical, among other apparent reasons, is the preferred liquid for effecting the precalcination agglomeration treatment of this invention. However, as also indicated hereinbefore, substantially any liquid possessing the characteristic of sufficient fluidity, or which may be rendered sufficiently fluid by temperature variations, etc., to enable spray application is also applicable in the practice of the present invention. Suitable liquids or classes of liquids are, for example, aqueous solutions, liquid hydrocarbons both aliphatic and aromatic, alcohols, aldehydes, ketones, organic or carboxylic acids, amines, oils and the like. The following sets forth some of the many suitable liquids: Water, methanol, benzene, methylethyl ketone, Stoddard solvent, perchlorethylene, #2 fuel oil, glycerine, triethanol amine, oleic acid and linseed oil. Liquids of substantially any kind or class may be advantageously and successfully utilized in the agglomeration of the perlite particles and the carrying out of this invention.

From the foregoing it is clear that the procedure of the invention can be used for several purposes in commercial practice. As indicated in Example I, this invention enables the use of a flux calcining procedure for the manufacture of filter aids with flow rates heretofore not obtainable from No Agua and certain other types of perlite ore. The data of Example IV establish that products comparable to those of the highest alpharate, diatomaceous silica may be produced. Hence, it is clear that filter aids comparable to those of other origin may be formed when employing the procedure of this invention. Obviously, the production of such premium products by use of this invention is of commercial benefit. The use of this invention also extends to permit the use of expanded, milled products possessed of a higher than average amount of fines or fragmentations by agglomerating the product.

CONCLUSION

It is therefore seen from the foregoing description that improved perlite products are obtainable. This is especially true with regard to filter aid products wherein flow rate properties greater than 4 times those heretofore obtainable are produced.

The preferred process involves the use of an agglomerating agent and/or a fluxing agent added to expanded, milled perlite, or, in other words, the finished product heretofore, and then subjecting the product to a calcination step followed by subsequent milling.

It will be appreciated that the calcining technique of this invention may have uses other than in the production of fast flow rate filter aids. For example, the benefits of the agglomeration and calcining methods employed in this invention may also be used to manufacture fillers of perlite.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What I claim is:

1. The method of manufacturing an improved perlite product which comprises agglomerating expanded perlite particles by mixing said particles and adding to the moving mass of particles atomized droplets of liquid in amount sufficient to coalease the mixture whereby the liquid is distributed throughout the mass of perlite with the resulting formation of discrete agglomerates, then subjecting the thus treated perlite particles to calcination.

2. The method of manufacturing an improved perlite filter aid which comprises agglomerating expanded perlite particles by mixing said particles while substantially preserving the structure thereof and adding to the moving mass of particles atomized droplets of liquid in amount sufficient to coalesce the mixture into discrete agglomerates whereby the liquid is distributed throughout the mass of perlite, then subjecting the thus treated perlite particles to calcination in the presence of a flux in amount sufficient to effect sintering of the perlite particles during calcination.

3. The method of manufacturing an improved perlite product which comprises mixing with expanded perlite particles finely divided flux in amount sufficient to effect sintering of said particles during calcination, agglomerating the perlite particles by mixing said particles and adding to the moving mass of particles atomized droplets of liquid in amount sufficient to coalesce the perlite particles into discrete agglomerates, then subjecting the thus treated perlite particles to calcination.

4. The method of manufacturing a perlite product which comprises agglomerating expanded perlite particles by mixing said particles while substantially preserving the structure thereof and adding to the moving mass of particles atomized droplets of liquid in amount approximately 10% to 100% by weight of the dry perlite whereby the liquid is distributed throughout the mass of perlite to form discrete agglomerates, then subjecting the treated perlite particles to calcination.

5. The method of manufacturing a perlite product comprising agglomerating the resulting product of a perlite expansion process by mixing said resulting product in the presence of atomized droplets of liquid in amount approximately 10% to 100% by weight of the dry perlite and then subjecting the thus treated perlite to calcination.

6. The method of manufacturing an improved perlite filter aid which comprises agglomerating a finished perlite filter aid produced from a conventional perlite expansion process by mixing said particles and adding to the moving mass of particles atomized droplets of water in amount approximately 10% to 100% by weight of the dry perlite whereby the water is distributed throughout the mass of perlite, then subjecting the thus treated perlite particles to calcination in the presence of a flux in amount sufficient to effect sintering of the perlite particles during calcination.

7. The method of manufacturing a perlit filter aid which comprises agglomerating expanded perlite particles by mixing said particles while substantially preserving the structure thereof and adding to the moving mass of particles atomized droplets of water in amount approximately 10% to 100% by weight of the dry perlite, whereby the water is distributed throughout the mass of perlite, adding to the thus agglomerated perlite finely divided flux particles in amount sufficient to effect sintering of the perlite particles during calcination, then subjecting the thus treated perlite particles to calcination.

8. The method of manufacturing a perlite product as defined in claim 7 wherein the flux is sodium carbonate.

9. The method of manufacturing a perlite product as defined in claim 7 wherein the flux is present in amount up to approximately 20% by weight of the dry perlite.

10. The method of manufacturing an improved perlite filter aid which comprises calcining discrete agglomerates of expanded perlite, said discrete agglomerates being formed prior to calcination by adding atomized droplets of liquid to a moving mass of perlite particles in amount approximately 10% to 100% by weight of the perlite while mixing said materials to obtain distribution of said liquid throughout the mass of perlite.

References Cited by the Examiner

UNITED STATES PATENTS

| 2,304,382 | 12/1942 | Shoeld | 23—313 |
| 2,798,674 | 7/1957 | Denning | 210—500 X |
| 2,892,240 | 6/1959 | Frankenhoff | 106—40 X |
| 2,926,137 | 2/1960 | Calvert | 210—500 |
| 2,946,693 | 7/1960 | Booth | 106—40 |
| 2,956,016 | 10/1960 | Leppla | 210—500 X |
| 2,967,154 | 1/1961 | Beerman | 252—449 |
| 2,977,240 | 3/1961 | Houston | 252—378 X |
| 3,013,981 | 12/1961 | Riede | 252—449 |

OTHER REFERENCES

"The Condensed Chemical Dictionary," 4th edition, Reinhold Publishing Corp., New York 18, N.Y., 1950.

"Perlite Popping: From a Shaky Start, a Solid New Industry," reprinted from Chemical Engr., January 1950.

MAURICE A. BRINDISI, *Primary Examiner.*

JULIUS GREENWALD, *Examiner.*